US012591823B2

(12) United States Patent
Ryali et al.

(10) Patent No.: US 12,591,823 B2
(45) Date of Patent: Mar. 31, 2026

(54) DECENTRALIZED DYNAMIC POLICY LEARNING AND IMPLEMENTATION SYSTEM

(71) Applicant: Bank of America Corporation, Charlotte, NC (US)

(72) Inventors: Venkata Karthik Ryali, Hyderabad (IN); Durga Prasad Kutthumolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 629 days.

(21) Appl. No.: 17/875,123

(22) Filed: Jul. 27, 2022

(65) Prior Publication Data

US 2024/0037463 A1 Feb. 1, 2024

(51) Int. Cl.
*G06Q 10/0631* (2023.01)
(52) U.S. Cl.
CPC .............................. *G06Q 10/06311* (2013.01)
(58) Field of Classification Search
CPC .................................................. G06Q 10/06311
See application file for complete search history.

(56) References Cited

U.S. PATENT DOCUMENTS

| | | | |
|---|---|---|---|
| 5,950,195 A | 9/1999 | Stockwell et al. | |
| 11,216,263 B2 | 1/2022 | Dawe et al. | |
| 2008/0195360 A1 | 8/2008 | Chiang et al. | |
| 2011/0078759 A1 | 3/2011 | Choi et al. | |
| 2012/0246303 A1* | 9/2012 | Petersen | G06F 16/1734 |
| | | | 709/224 |
| 2014/0033267 A1 | 1/2014 | Aciicmez | |
| 2018/0268133 A1* | 9/2018 | Fox | G06F 21/566 |
| 2018/0375899 A1 | 12/2018 | Brett | |
| 2021/0157312 A1* | 5/2021 | Cella | H04L 1/0041 |
| 2022/0067233 A1* | 3/2022 | Blackwell, II | A63F 13/65 |
| 2022/0108262 A1* | 4/2022 | Cella | G05B 17/02 |
| 2022/0156657 A1* | 5/2022 | Brannon | G06Q 10/067 |
| 2022/0256647 A1* | 8/2022 | Salmasi | H04L 67/12 |
| 2023/0237408 A1* | 7/2023 | Saigh | G06Q 40/04 |
| | | | 705/7.36 |

OTHER PUBLICATIONS

Alizadehsalehi, Sepehr, et al. ("Digital twin-based progress monitoring management model through reality capture to extended reality technologies (DRX)"), Emerald Group Publishing, Apr. 6, 2021, pp. 200-236.*
Anshari, Muhammad, et al. (Digital Twin: Financial Technology's Next Frontier of Robo-Advisor), Journal of Risk and Financial Management, Apr. 2, 2022, pp. 1-9.*

* cited by examiner

*Primary Examiner* — Beth V Boswell
(74) *Attorney, Agent, or Firm* — Banner & Witcoff, Ltd.

(57) ABSTRACT

A decentralized dynamic policy learning and implementation system automatically processes incoming report and generates real-time data based on pre-configured rules and uses a graph-based transformer to generate new policies. The generation of the new polices is based on new alerts or notifications indicating an error with existing policies. An intelligent auto-router detects new security issues and re-routes information to generate the new policy and initiate analysis via a digital twin based on decisioning data points. The digital twin system qualifies the new policy to determine effectiveness in overcoming the security issue. An extended reality environment automatically generates an extended reality environment based on a graph node structure of the policy.

20 Claims, 9 Drawing Sheets

Compliance Office XR System –
Ecosystem to generate new actions

Here a compliance officer related to a specific domain area acts in an immersive
environment or may generate a new object on top of the action taken in this
turn, which creates a new actionable node

FIG. 3

DECENTRALIZED DYNAMIC POLICY LEARNING AND IMPLEMENTATION SYSTEM

BACKGROUND

Aspects of the disclosure relate to computer hardware and software. In particular, one or more aspects of the disclosure generally relate to computer hardware and software for dynamic generation and implementation of digital policies across an enterprise computing network.

Large organizations, such as financial institutions and other large enterprise organizations, may provide many different products and/or services. To support these complex and large-scale operations, a large organization may own, operate, and/or maintain many different computer systems that service different internal users and/or external users in connection with different products and services. In addition, some computer systems internal to the organization may be configured to exchange information with computer systems external to the organization so as to provide and/or support different products and services offered by the organization.

To support the products and services, enterprise organizations may utilize various software applications, which may execute in various computing environments and be subject to different sets of policies in different computing environments. For instance, such policies may impose rules governing how confidential information and/or other sensitive data is created, modified, and/or otherwise used by specific applications in specific environments. In many instances, however, it may be difficult to ensure that specific software applications in different computing environments comply with various policies, while also attempting to optimize the resource utilization, bandwidth utilization, and efficient operations of the computing infrastructure that hosts and/or otherwise supports the various software applications and computing environments.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary presents some concepts of the disclosure in a simplified form as a prelude to the description below.

Aspects of the disclosure relate to computer systems that provide effective, efficient, scalable, and convenient ways of securely and uniformly managing how internal computer systems exchange information with external computer systems to provide and/or support different products and services offered by an organization (e.g., a financial institution, and the like).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes automatic generation, testing, and implementation of computing policies.

A major challenge for compliance data testing is performing an identity check within a threat based on existing compliance data. To detect a pattern, activity information may be compared to a previously defined or generated activity profile. However, many drawbacks exist to a commonly used access control list approach. This access regulator list approach may only apply to files within a file system and does not apply to non-filter system objects. To improve processes, compliance data may be analyzed or evaluated to detect behavioral patterns and anomalies. When a particular pattern or anomaly is detected, a system may be triggered to send a notification and/or to perform a particular task. The resulting movement documents may be collected in a facts management system, which may be policy based. Data may be provided by one or more electronic notification methods including, for example, a generated e-mail, report, pop-up message, system message, and/or the like. The data may also be flagged based on a Threat Indicator. In an illustrative example, a generated report may include data corresponding to a financial transaction across data flows from a plurality of involved computing systems, which for some cases may include data from external systems (e.g., a clearing house computing system, and the like).

Managing tasks corresponding to compliance data method may be performed based on a threat indicator corresponding to an assortment of risks. The method may include a calendar task that enables access to a calendar screen to view programmed inspections corresponding to specific calendar dates. Additionally, the method may enable changes to previously scheduled inspection dates by entering new rearrangement dates, selectable from a obedience data set. Real-time flow diagrams may be captured using image algorithms.

In some cases, an illustrative system may automatically process incoming reports (e.g., daily compliance reports, monthly compliance reports, and the like) and, based on the processing, generate real-time data flow diagrams enabled with threat indicator identifiers based on one or more pre-configured rules. In some cases, the flow diagrams may be presented via one or more user interface screens on a computing device (e.g., a compliance risk officer dashboard and the like). A natural language processor may provide unconventional use of the flow diagrams via use of natural language generation (NLG) of one or more new policies. Additionally, customer use of a decentralized finance protocol (e.g., a Web3-based protocol) where node use may be switched automatically based on a priority associated with a desired action to identify aspects of the process that needs more focus. A graph-based and pre-trained policy network may generate new policies based on new alerts and/or notifications received from one or more upstream decentralized finance nodes. Additionally, new information security and/or compliance policies may be generated in a format (e.g., a graphical node format) by using ontology semantic data modelling for any new incoming flow received from the decentralized finance channel using a real-time API via a database engine (e.g., an auto-router-data access object engine), or the like. The intelligent auto-router decentralized autonomous organization (DAO) engine may detect new security threats and/or risks and may provide information to the graph-based new policy generation engine. The graph-based new policy generation engine may generate a new policy by following semantic ontology data modelling formatted procedure and may send the generated policy to the AutoRoute DAO engine and/or to specific DAO digital twin based on one or more decisioning data points and specialized domain attributes that exists in a decentralized autonomous digital twin policy based mesh, eco-system. The decentralized autonomous digital twin policy based mesh network eco-system may include a plurality of digital twins (e.g., digital robot applications). Each digital twins may be specialized to perform a specific application functionality similar to how a human would perform a similar action (e.g., performance of a claim processing activity, a collections activity, and the like). The knowledge base to generate new policies based on decentralized data object decisioning policy ensures that post implementation of the process results in a correct policy decision that is majorly impactful in overcoming most, if not all, of an identified potential security issue.

Decentralized data object decisioning may be used because of interdependencies between each domain with other domains. For example, mortgage servicing application functionality is interdependent upon collections application functionality. Additionally, online banking activities may be interdependent upon electronic deposit and/or withdrawal functionalities. By using decentralized data object decisioning, such interdependencies may be captured and/or modeled such that an auto-generated policy captures all interdependencies between systems to capture an entire scope of the identified security risk or security threat.

A post-policy decisioning application may process the policy graph node to generate an extended or augmented reality (XR) environment that may be processed by an XR-Environment reality apparatus such that the XR-environment will convert the graph node structure of the automatically generated policy into an immersive format by activating each node to perform an action for implementation by a user (e.g., a compliance officer) participating in an immersive XR-ecosystem. In the XR-environment, unique ways for each generated data flow component are enabled so that one or more necessary steps can be presented to and performed by associates in the XR-ecosystem. As such, the user may only be required to click a button, rather than placing a call or otherwise following up with an associate. After selecting the button, a notification may be sent and may be automatically completed when a response is received. The XR-ecosystem environment may indicate a pending request with a visual or audio indicator, such as by highlighting any open process in a first color (e.g., red) and completed processes in a second color (e.g., greed). In some cases, optional steps within the process may be indicated by use of a third color (e.g., yellow). Based on the selected action response, the XR-ecosystem environment notifies an affected application computing system (e.g., a decentralized finance node, or other like application node) with more details corresponding to the issue (e.g., where the issue was reported, possible steps to correct the issue, and the like). Based on the decentralized structure, the decentralized dynamic policy learning and implementation system may be used with and fit within any decentralized computing structure (e.g., a decentralized finance computing system, a hash graph ecosystem, and the like).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2F shows an illustrative process followed by a decentralized dynamic policy learning and implementation system in accordance with one or more aspects described herein: and FIG. 3 shows compliance information stored in a database in accordance with one or more aspects described herein.

DETAILED DESCRIPTION

Figure 1A:
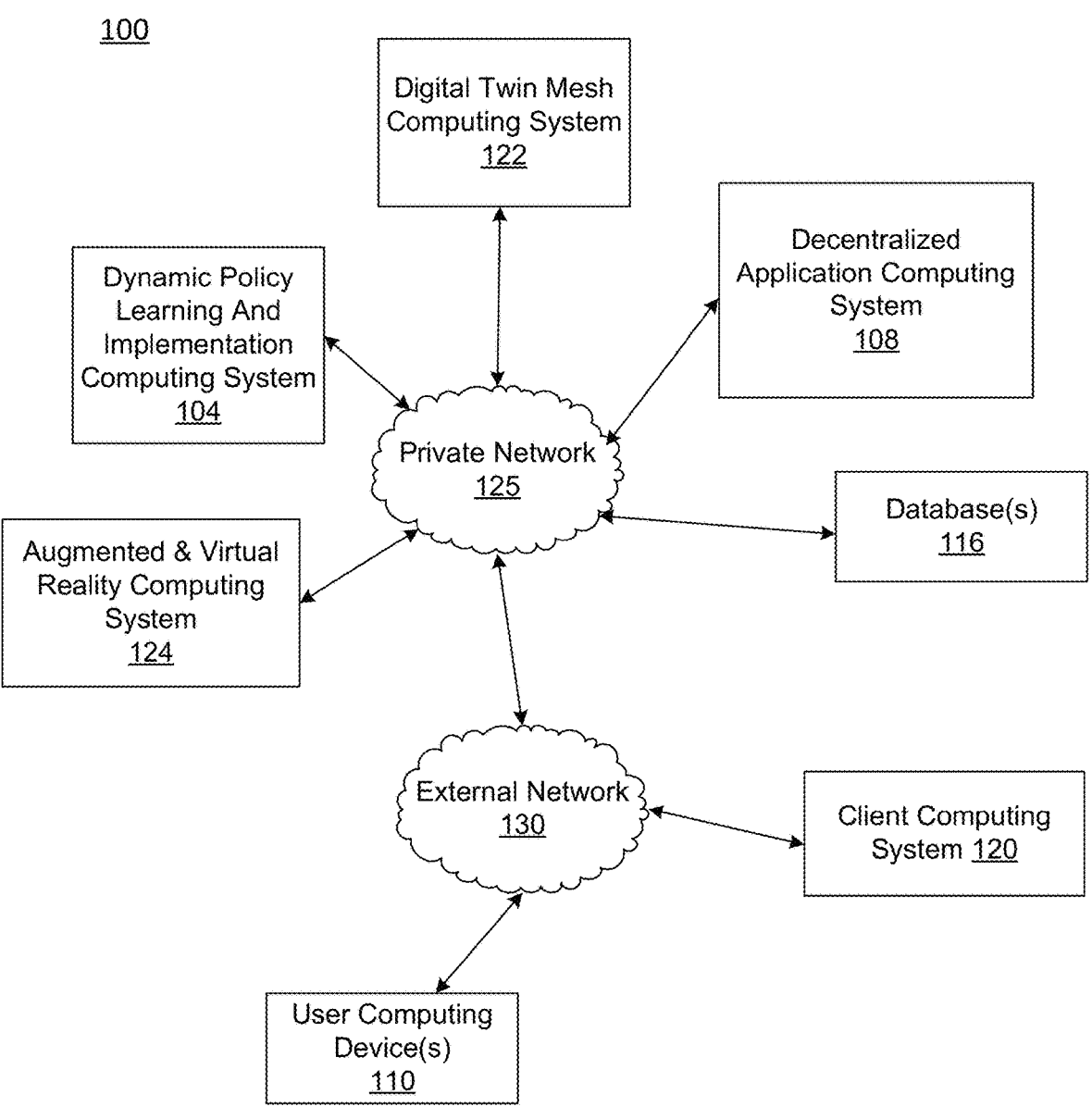
FIG. 1A shows an illustrative computing environment for a decentralized dynamic policy learning and implementation system, in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning (e.g., supervised, semi-supervised, reinforcement, and unsupervised), middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, primary node computers, nodes, personal computers, portable electronic devices, servers, node computers, smart devices, tablets, and/or workstations, which have one or more microprocessors or executors for executing or accessing the computer-executable software and data. References to computer machines and names of devices within this definition are used interchangeably in this specification and are not considered limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors, executors, cores, volatile and non-volatile memories, communication interfaces, etc.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of the same. Networks also include associated "network equipment" such as access points, ethernet adaptors (physical and wireless), firewalls, hubs, modems, routers, and/or switches located inside the network and/or on its periphery, and software executing on the foregoing.

The above-described examples and arrangements are merely some examples of arrangements in which the systems described herein may be used. Various other arrangements employing aspects described herein may be used without departing from the innovative concepts described.

FIG. 1A shows an illustrative computing environment 100 of a decentralized dynamic policy learning and implementation system, in accordance with one or more arrangements. The computing environment 100 may comprise one or more devices (e.g., computer systems, communication devices, and the like). The computing environment 100 may comprise, for example, a decentralized policy learning and implementation computing system 104, one or more decentralized application systems 108, one or more database(s) 116, a digital twin mesh computing system 122, and/or an augmented and virtual reality computing system 124, and/or the like. The one or more of the devices and/or systems, may be linked over a private network 125 associated with an enterprise organization (e.g., a financial institution, a business organization, an educational institution, a governmental organization and the like). The computing environment 100 may additionally comprise a client computing system 120 and one or more user devices 110 connected, via a public network 130, to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The decentralized policy learning and implementation computing system 104 may comprise one or more computing devices and/or other computer components (e.g., processors, memories, communication interfaces) configured to perform one or more functions as described herein. Further details associated with the architecture of the decentralized policy learning and implementation computing system 104 are described with reference to FIG. 1B.

The decentralized application computing systems 108, the digital twin mesh computing system 122 and/or the augmented and virtual reality computing system 124 may comprise one or more computing devices and/or other computer components (e.g., processors, memories, communication interfaces). In addition, the application system 108, the digital twin mesh computing system 122 and/or the augmented and virtual reality computing system 124 may be configured to host, execute, and/or otherwise provide one or more enterprise applications. In some cases, the decentralized application computing systems 108 may host one or more services configured facilitate operations requested through one or more API calls, such as data retrieval and/or initiating processing of specified functionality. In some cases, the digital twin mesh computing system 122 and/or the augmented and virtual reality computing system 124 may be configured to communicate with one or more of the application systems 108 such as via direct communications and/or API function calls and the services. In an arrangement where the private network 125 is associated with a financial institution (e.g., a bank), the decentralized application computing systems 108 may be configured, for example, to host, execute, and/or otherwise provide one or more transaction processing programs, such as an online banking application, fund transfer applications, and/or other programs associated with the financial institution. The decentralized application computing systems 108, the digital twin mesh computing system 122 and/or the augmented and virtual reality computing system 124 may comprise various servers and/or databases that store and/or otherwise maintain account information, such as financial account information including account balances, transaction history, account owner information, and/or other information. In addition, the decentralized application computing systems 108, the digital twin mesh computing system 122 and/or the augmented and virtual reality computing system 124 may process and/or otherwise execute transactions on specific accounts based on commands and/or other information received from other computer systems comprising the computing environment 100. In some cases, one or more of the decentralized application computing systems 108, the digital twin mesh computing system 122 and/or the augmented and virtual reality computing system 124 may be configured, for example, to host, execute, and/or otherwise provide one or more transaction processing programs, such as electronic fund transfer applications, online loan processing applications, and/or other programs associated with the financial institution.

The decentralized application computing systems 108 may be one or more host devices (e.g., a workstation, a server, and the like) or mobile computing devices (e.g., smartphone, tablet). In addition, one or more of the decentralized application computing systems 108 may be linked to and/or operated by a specific enterprise user (who may, for example, be an employee or other affiliate of the enterprise organization) who may have administrative privileges to perform various operations within the private network 125. In some cases, the decentralized application computing systems 108 may be capable of performing one or more layers of user identification based on one or more different user verification technologies including, but not limited to, password protection, pass phrase identification, biometric identification, voice recognition, facial recognition and/or the like. In some cases, a first level of user identification may be used, for example, for logging into an application or a web server and a second level of user identification may be used to enable certain activities and/or activate certain access rights.

In some cases, the decentralized application computing systems 108 may be implemented in a decentralized application environment (e.g., a decentralized computerized finance application environment, or the like). The application computing systems 108 may process software applications within a decentralized smart contract platform. The main benefit of the decentralized environment is that electronic requests may be permissionless and censorship resistance. For example, any application can access the applications and/or no one environment controls the applications. A separate but related concept is a decentralized autonomous organization (DAO), which includes instructions of operation encoded into smart contracts that determine who can execute what behavior or upgrade. It is common for a DAO to have some kind of governance token, which gives an owner some percentage of the impact on future outcomes. In some cases, the governance tokens may be managed within a decentralized ledger computing system, such as a blockchain system.

The digital twin mesh computing system 122 may comprise one or more computing devices and/or other computer components (e.g., processors, memories, communication interfaces). The digital twin mesh computing system 112 may be included in an industrial internet of things (IIoT) computing environment. The digital twin mesh computing system 122 may provide comprehensive, structured and effective digital representations of aspects of computing system functionality and/or connected systems, where the digital twin status may be updated in real-time based on the associated applications. Each digital twin of the digital twin mesh computing system 122 may represent humans processing computerized processes in real-time in an automated fashion, where in some cases, the cognitive automation processed by the digital twin may be unintelligible to humans. The digital twin mesh computing system 122 is used to provide testing to ensure re-usability, scalability and extensibility, of the automatically generated processes without intervention of a human.

The augmented and virtual reality computing system 124 may comprise one or more computing devices and/or other computer components (e.g., processors, memories, communication interfaces). The augmented and virtual reality computing system 124 may process an XR-environment configured to process a compliance policy to allow individual users of a compliance office to monitor and control an anti-corruption compliance program for an association, where compliance program uniqueness is a key deliberation. A compliance program XR-environment may be industry-specific and/or unique to the organization, and tailored to fit the requirements of the individual organization, particular geographic operating locations, related risks, and the overall compliance requirements of its specific industry. The XR-environment corresponding to the compliance program also may reflect the compliance requirements obligatory on all corporations and the laws that they must follow. The anti-corruption program may be integrated into the overall compliance program. Further, each organization ensures that their compliance programs are receiving ongoing and individualized evaluation and modification, such as via automated policy generation as discussed herein.

The compliance office policies may ensure that an anti-corruption compliance program addresses the risks inherent to doing business in foreign countries. These risks result from the various aspects and forces that come into play in the global business environment. These risks are particularly problematic to the Foreign Corrupt Practices Act (FCPA) and anti-corruption laws in various countries. Many companies prosecuted for FCPA violations over the years either outright ignored or were willfully blind to these risks. Their compliance programs were inadequately designed to recognize and mitigate risk. As such, the automated policy generation discussed herein may automatically generate policies tailored to each individual country, which may be modified in real time as issues are identified.

The client computing system 120 may be configured, for example, to host, execute, and/or otherwise provide one or more transaction processing programs, such as goods ordering applications, electronic fund transfer applications, online loan processing applications, and/or other programs associated with providing a product or service to a user. With reference to the example where the client computing system 120 is for processing an electronic exchange of goods and/or services. The client computing system 120 may be associated with a specific goods purchasing activity, such as purchasing a vehicle, transferring title of real estate may perform communicate with one or more other platforms within the client computing system 120. In some cases, the client computing system 120 may integrate API calls to request data, initiate functionality, or otherwise communicate with the one or more decentralized application computing systems 108, such as via the services. For example, the services may be configured to facilitate data communications (e.g., data gathering functions, data writing functions, and the like) between the client computing system 120 and the one or more decentralized application computing systems 108.

The user device(s) 110 may be computing devices (e.g., desktop computers, laptop computers) or mobile computing device (e.g., smartphones, tablets) connected to the network 125. The user device(s) 110 may be configured to enable the user to access the various functionalities provided by the devices, applications, and/or systems in the network 125.

The database(s) 116 may comprise one or more computer-readable memories storing information that may be used by the dynamic policy and implementation computing system, the decentralized application computing systems 108, and/or the like. For example, the database(s) 116 may store compliance data, operational data logs, existing policy information, international laws, business rules, enterprise policies, and the like. In an arrangement, the database(s) 116 may be used for other purposes as described herein. In some cases, the client computing system 120 may write data or read data to the database(s) 116 via the services.

In one or more arrangements, the decentralized policy learning and implementation computing system 104, the one or more decentralized application systems 108, the one or more database(s) 116, the a digital twin mesh computing system 122, the augmented and virtual reality computing system 124, the user the client computing system 120, the user devices 110, and/or the other devices/systems in the computing environment 100 may be any type of computing device capable of receiving input via a user interface, and communicating the received input to one or more other computing devices in the computing environment 100. For example, the decentralized policy learning and implementation computing system 104, the one or more decentralized application systems 108, the one or more database(s) 116, the a digital twin mesh computing system 122, the augmented and virtual reality computing system 124, the user the client computing system 120, the user devices 110, and/or the other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the decentralized policy learning and implementation computing system 104, the one or more decentralized application systems 108, the one or more database(s) 116, the a digital twin mesh computing system 122, the augmented and virtual reality computing system 124, the user the client computing system 120, the user devices 110, and/or the other devices/systems in the computing environment 100 may, in some instances, be and/or comprise special-purpose computing devices configured to perform specific functions.

Figure 1B:
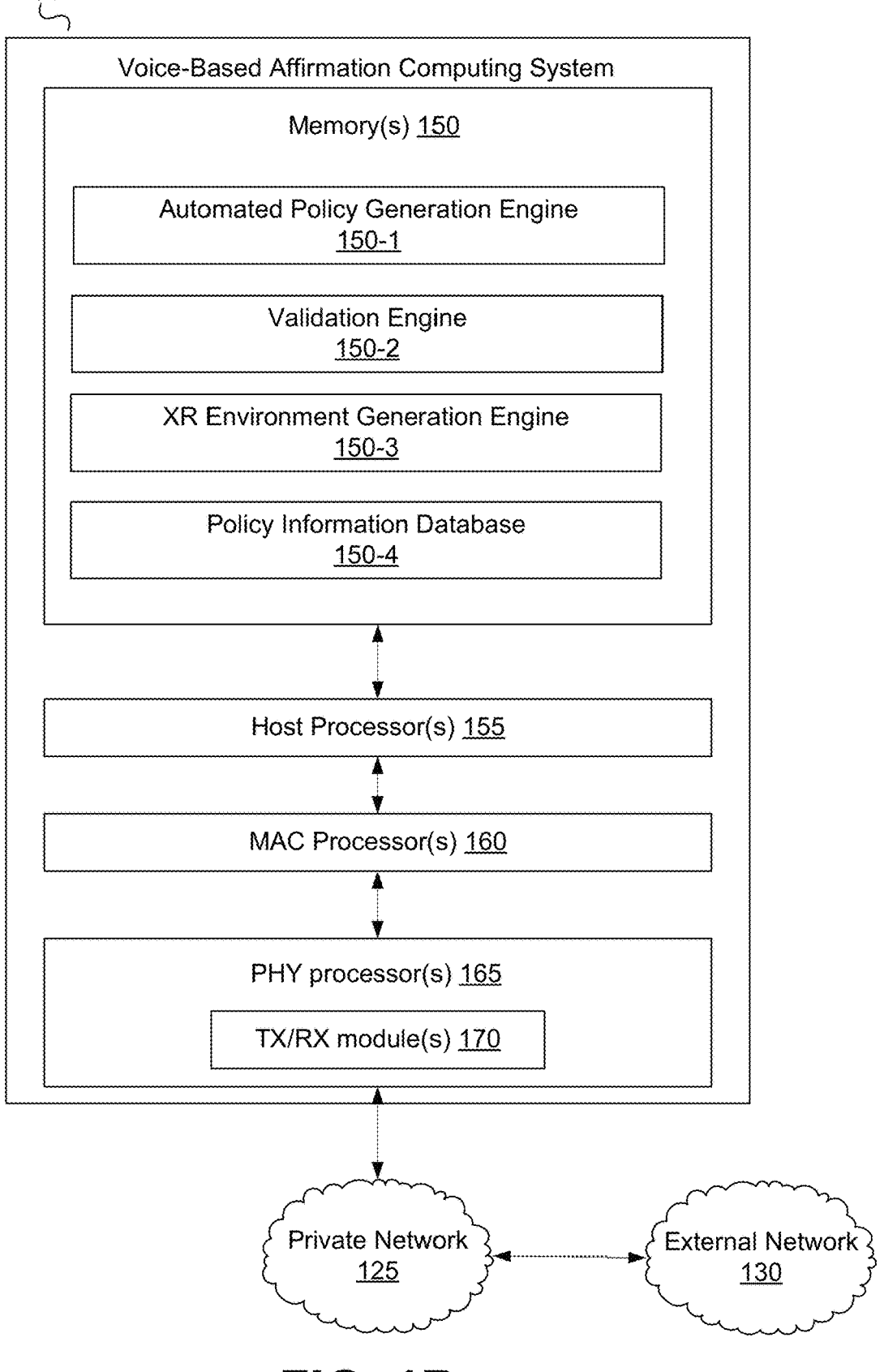
FIG. 1B shows an illustrative computing platform enabled for a decentralized dynamic policy learning and implementation system, in accordance with one or more aspects described herein.

FIG. 1B shows an illustrative decentralized policy learning and implementation computing system 104 in accordance with one or more examples described herein. The decentralized policy learning and implementation computing system 104 may be a stand-alone device and/or may at least be partial integrated with other computing systems that may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The decentralized policy learning and implementation computing system 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. The memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the decentralized policy learning and implementation computing system 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the decentralized policy learning and implementation computing system 104 may be configured to execute machine readable instructions stored in memory 150. The memory 150 may comprise (i) one or more program modules/engines having instructions that when executed by the one or more processors cause the decentralized policy learning and implementation computing system 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the decentralized policy learning and implementation computing system 104 and/or by different computing devices that may form and/or otherwise make up the decentralized policy learning and implementation computing system 104. For example, the memory 150 may have, store, and/or comprise an automated policy generation engine 150-1, a validation engine 150-2, and XR-environment generation engine 150-3, a policy information database 150-4, and/or the like. The automated policy generation engine 150-1 may have instructions that direct and/or cause the decentralized policy learning and implementation computing system 104 to perform one or more operations associated with generating a new policy based on analysis of data logs and/or other compliance information, and the like. The validation engine 150-2 may have instructions that may cause the decentralized policy learning and implementation computing system 104 to automatically evaluate and/or evaluate operation of the automatically generated policies generated by the automated policy generation engine 150-1, the XR-environment generation engine 150-3 may automatically generate an XR-environment corresponding to a policy validated by the validation engine 150-2 to facilitate compliance to one or more enterprise policies according to aspects of this disclosure.

While FIG. 1A illustrates decentralized policy learning and implementation computing system 104 and/or the other systems of the computing environment 100, as being separate elements connected in the private network 125, in one or more other arrangements, functions of one or more of the above may be integrated in a single device/network of devices. For example, elements in decentralized policy learning and implementation computing system 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, one or more other systems of the computing environment 100.

Figure 2A:
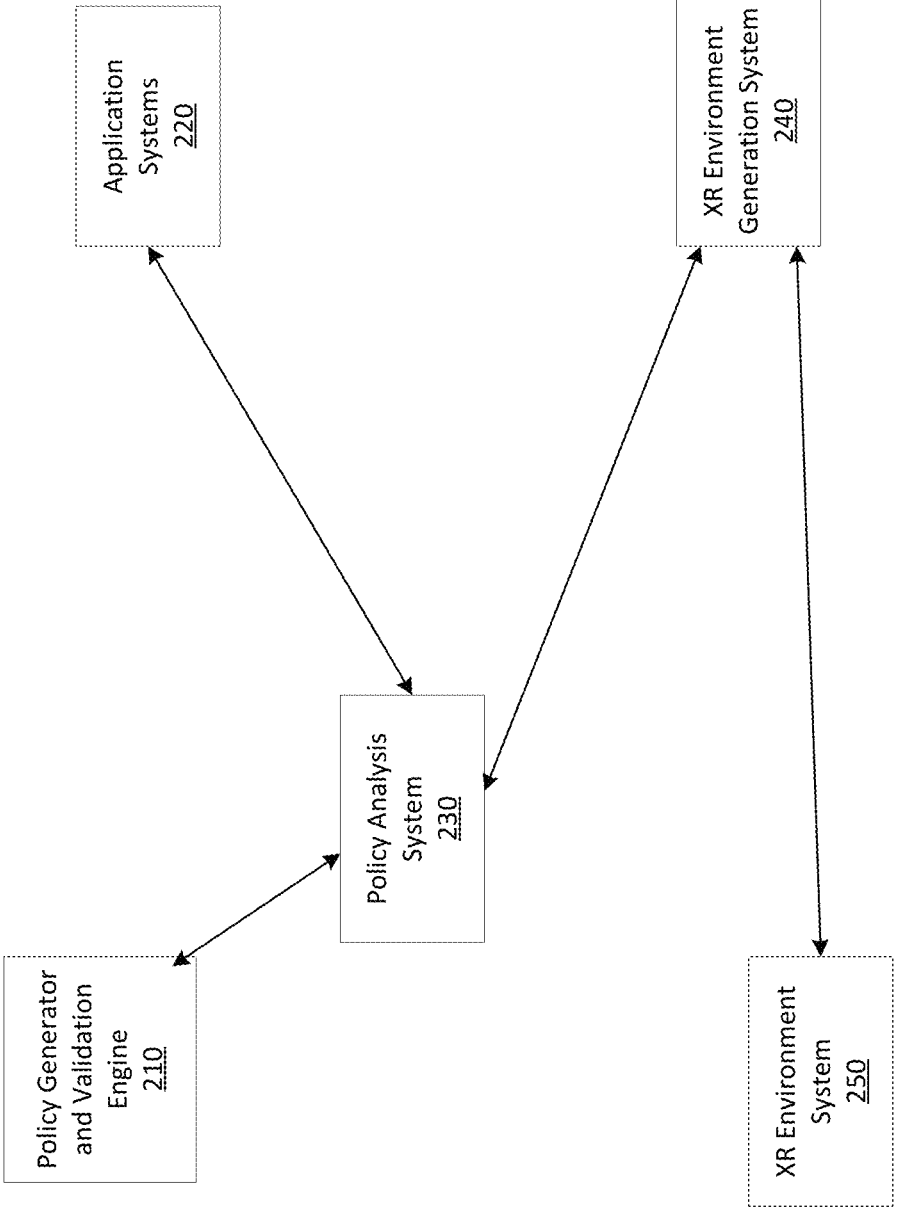

FIGS. 2A-2F shows an illustrative process followed by a decentralized dynamic policy learning and implementation system in accordance with one or more aspects described herein. FIG. 2A shows an illustrative block diagram of computing systems configured to perform decentralized dynamic policy learning, testing and implementation according to one or more aspects described herein. For example, a policy generator and validation engine 210 may analyze information to identify one or more patterns that may not be covered by an electronically implemented policy. Based on this analysis, the policy generator and validation engine 210 may generate a new policy for automatic implementation within the enterprise computing system. A policy analysis system 230 may be configured to automatically analyze operation of the automatically generated policy, where additional information associated with the policy may be identified and/or gathered from one or more application systems 220 whose operation may be governed, at least partially, by the automatically generated policy. Once validated and tested, a newly generated policy may be implemented for operation. To enforce operation of the policy, an XR-environment may be generated by the XR-environment generation system 240 for operation in one or more XR-environment systems 250.

Figure 2B:
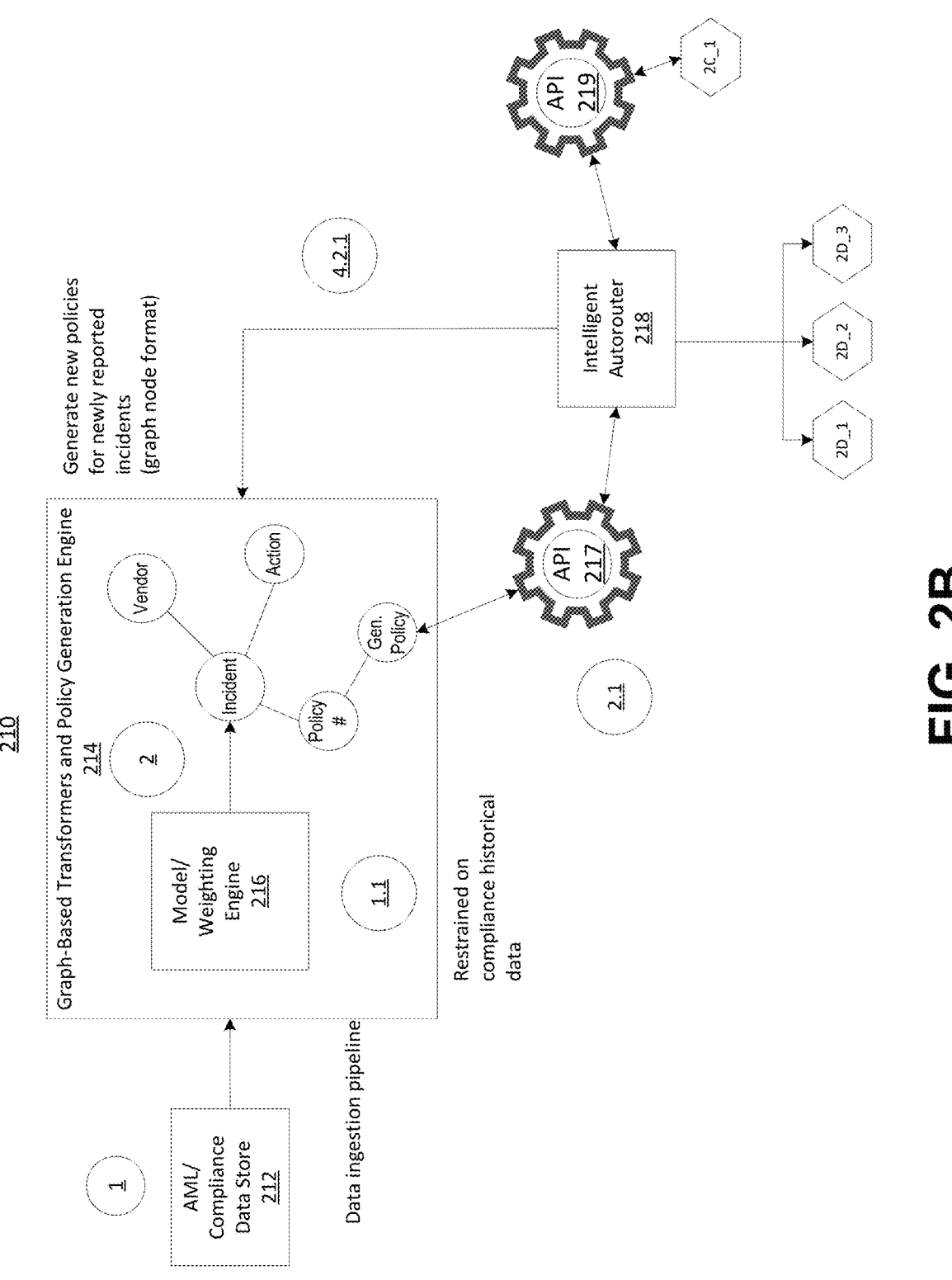
Figure 3:
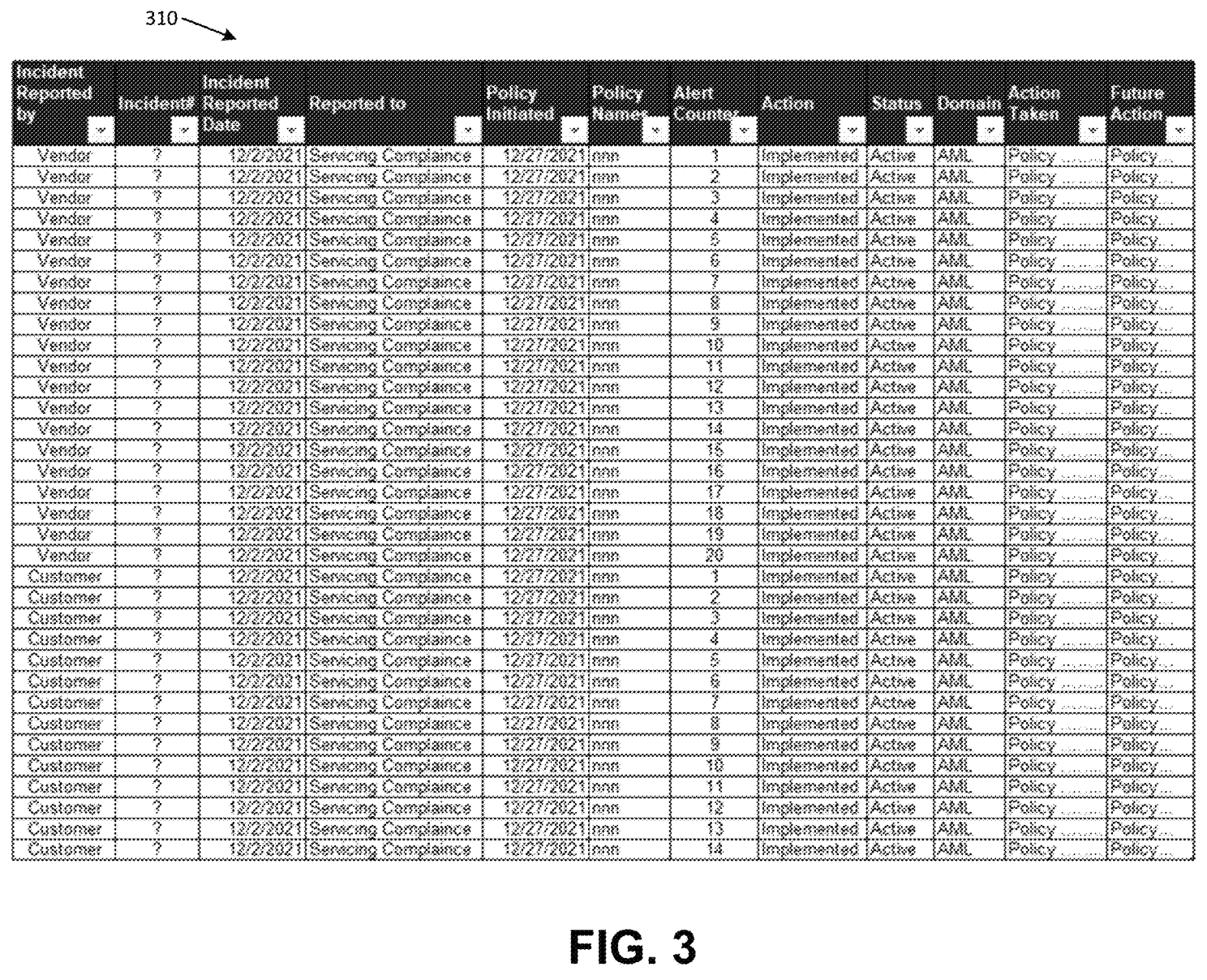

FIG. 2B illustrates operation of the policy generator and validation engine 210 according to aspects of this disclosure. At 1, data for analysis may be stored in a database, such as the data store 212. The data store may store compliance data (e.g., monetary use obfuscation data, and the like) corresponding to one or more computing systems upon which at least one policy applies. Illustrative data stored in the data store 212 is shown in Table 310 of FIG. 3. A compliance database or data store may store data corresponding to a risk of lawful or governing permissions, and/or material monetary loss or injury to the reputation of the enterprise organization arising from any failure of the enterprise organization to comply with the requirements of appropriate laws, rules, regulations in one or more jurisdictions in which the enterprise organization operates and/or with internal policies and/or procedures. The enterprise organization may be committed to the peak level of compliance with applicable laws, instructions and guidelines, as well as internal rules and values. The enterprise organization looks to eliminate violations of legislative or regulatory requirements. Policies, such as automated policies to analyze conditions and operations to anticipate and assess compliance risks to allow core businesses and to respond to these risks effectively should they materialize.

Although the enterprise organization endeavors to prevent compliance violations in their operations, the enterprise organization cannot fully abolish compliance risks. However, by managing such risks, such as through automatic policy analysis and generation, the enterprise organization may manage the risk exposure by setting and adjusting important risk tolerances through generation of new policies to reduce any exposure to financial loss, reputational harm, and/or regulatory sanctions. An illustrative global compliance database, such as those illustrated in FIG. 3, may be used to analyze operational effectiveness of existing policies and/or generate new policies when a need arises. A compliance database may contain policies (e.g., a monetary use obfuscation compliance policy datastore) may store policies and operation risk management requirements may be used to oversee and execute the requirements. Compliance and operational jeopardy rules, values, and standard operating procedures provide additional details to facilitate execution of the compliance requirements automatically by all computing systems (e.g., application computing systems, data security management computing systems, and the like) of the enterprise computing system.

At 1.1, pre-trained weights may be used and/or re-trained based on historical data by the model/weighting engine 216. In some cases, the model/weighting engine 216 may be a graph based transformation and policy generation engine that uses pre-trained weights and/or historical compliance data fed to a graph node format engine.

At 2, the graph-based transformers and policy generation engine may generate new policies for newly reported incidents (see FIG. 3) in one or more formats, such as a graph node format. A graph node engine and editor may be written in a computing language (e.g., Javascript) like UDK Blueprints that may originate with its own editor in a rendering engine. The engine can run client side or server side using one or more nodes. The engine may permit export as graphs in one or more formats (e.g. as JavaScript object notations (JSONs) and the like) to be included in applications independently. Such graphs are naturally additive, which means that new relationships, new nodes, and new subgraphs can be easily added to an existing structure without disturbing existing queries and application functionality. These properties have generally positive implications for developer productivity and project risk because of the graph model's flexibility. Interactive modeling and its attendant application activities separate an application's underlying storage model from the conceptual worldview of its stakeholders and its use in one or more computing systems. Relational databases that may normally be used to manage policy and compliance information—with their rigid schemas and complex modeling characteristics—are not an especially good tool for supporting rapid change. To overcome these deficiencies the described model shown in FIGS. 2A-2F is closely aligned with the domain, and without sacrificing performance. Additionally, this graph model supports policy evolution while maintaining the integrity of the data as it undergoes rapid change and growth. How, then, does this process differ when realized with a graph data model?

A property graph is made up of nodes, relationships, and properties. Nodes contain properties. Nodes may be thought of as documents that store properties in the form of arbitrary key-value pairs. The keys are strings and the values are arbitrary data types. In an illustrative example related to monetary use obfuscation incidents and vendor-based action taken. Such relationships connect and structure nodes. Together, a connection's direction and label add semantic clarity to the structuring of nodes. Like nodes, relationships can also have properties. The ability to add properties to relationships is particularly useful for providing additional metadata for graph algorithms, adding additional semantics to relationships include, for example, vendor identifiers, policy numbers or other identifiers and/or description information, action taken information such as action identifiers generated, and for constraining auto generated policies at runtime.

Figure 2C:
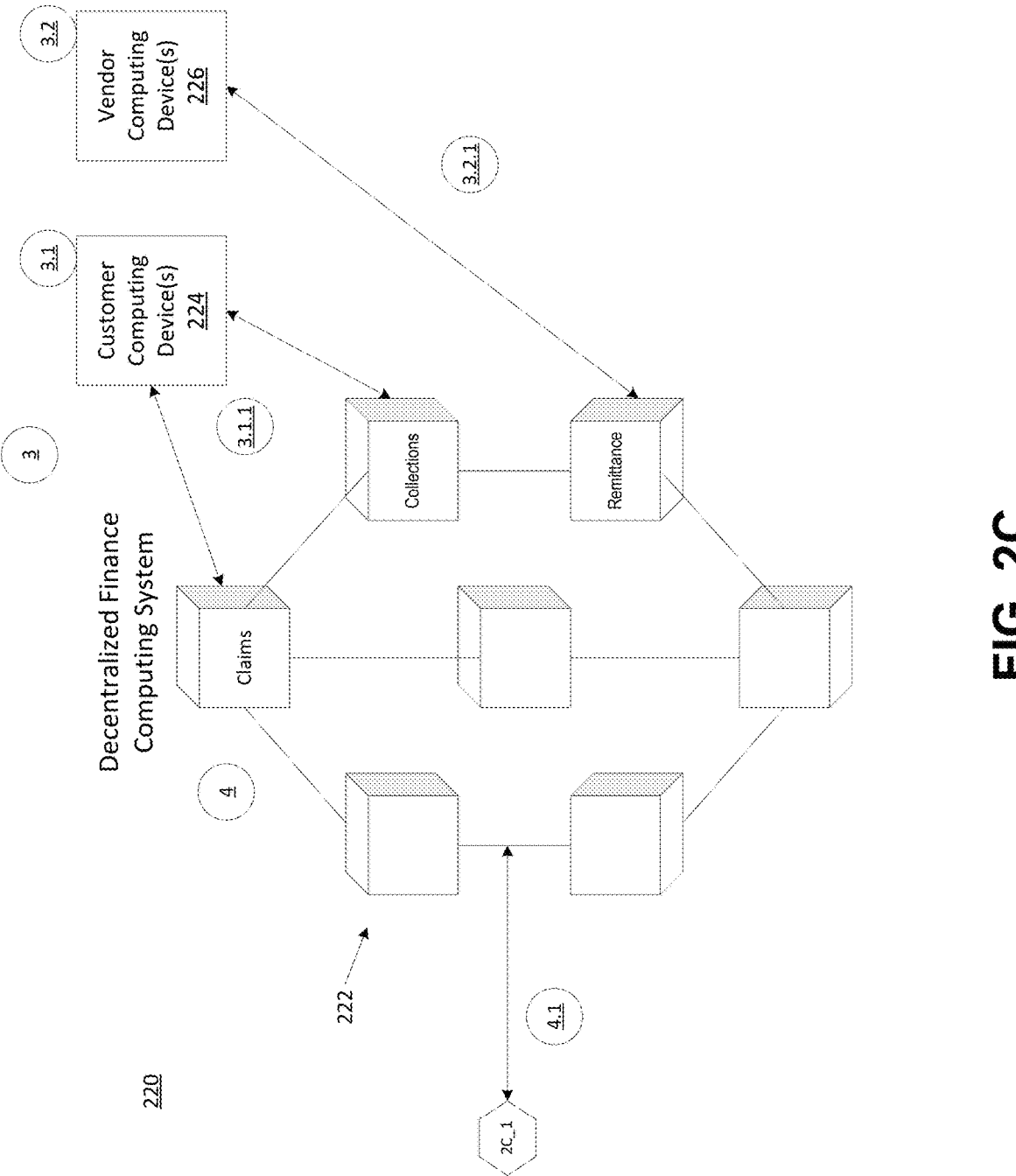

FIG. 2C shows customer (e.g., customer computing devices 224) and/or vendor computing system (e.g., vendor computing devices 226) connectivity to one or more enterprise organization computing systems, such as a decentralized financial computing system 222 for performance of various electronically provided financial products or services such as claims processing, collections activity processing, remittance processes, and/or the like.

At 4, the decentralized financial computing system 222 may operate a blockchain at 4.1. Decentralized financial (DeFi) computing systems, such as the decentralized financial computing system 222 are based around use of a distributed ledger computing system, such as blockchain. Indeed, key structure to all DeFi computing systems is the decentralizing backbone: a blockchain. Generally, blockchains are software procedures that allow multiple parties to function under shared expectations and data without requiring a fundamental trust of any or all of the other parties. The information can be anything, such as location and terminus substantial of items in a supply chain or account balances of a token. Updates are packaged into "blocks" and are "chained" cryptographically to allow an audit of the prior history to create an immutable data record.

Blockchains exist because of consensus protocols—sets of rules that determine which blocks can become part of the chain and thus become the "fact." These consensus procedures are intended to resist malicious tampering up to a certain safety assured. For example, blockchains may use the proof of work (PoW) consensus protocol, which relies on a computationally and liveliness rigorous to control block to additions. The members agree that the longest chain of blocks is the "truth". As such, if malicious attackers want to make a longer chain that contains malicious transactions, the attackers must outpace all the computational work of the whole rest of the network. Accordingly, an attacker would need most of the organization's computing power ("hash rate") to achieve this—such as a 51 percent attack being the frontier of information security. Fortunately, it is extremely difficult for any performer, even an entire computing system, to amass this much system power on the most widely used blockchains, such as Bitcoin or Ethereum. Even if most of the grid power can be temporarily acquired, the amount of block history that can be overwritten is forced by how long this majority can be maintained. If no malevolent party can acquire majority control of the system computational power, the communications will be processed by the good faith performers and attached to the ledger when a block is "won."

Many alternative agreement instruments exist, the most important of which is proof of stake (PoS). Validators in PoS commit some capital (e.g., the stake) to attest that the block is valid and make themselves available by staking their cryptocurrency. Then, they may be selected to propose a block, which needs to be attested by many of the other validators. Validators profit by both proposing a block and attesting to the validity of others' proposed blocks. PoS is much less computationally intensive and requires massively less energy.

With respect to distributed ledger systems, such as block-chain, the greatest widespread application of this technology is cryptocurrency. Here, a token (usually scarce) that is cryptographically protected and relocated. The scarcity is what assures the possibility of value and is itself an innovation of blockchain because, classically, digital objects are easily copied. No one can post a false contract without proprietorship of the corresponding account due to the unequal key cryptography protecting the accounts. One "public" key representing a report is necessary to receive tokens and a "private" key is needed to unlock and apply tokens over which you have custody. This type of cryptography is used to protect credit card data and data when using the Internet. A solitary account cannot "double spend" its tokens because, subsequently, the journal provides an audit trail of the stability at any given time. As such, a faulty transaction would not clear. The aptitude to prevent a double spend without a central authority illustrates the primary advantage of using a blockchain to maintain the underlying ledger.

An illustrative system using this cryptocurrency model is the Bitcoin blockchain, which is used almost wholly as a payment system. The system allows storing and transacting bitcoins across the globe in real time with no mediators or censorship. This is powerful value proposition is at least a portion of what gives bitcoin its value. Even though its system effects are strong, some competitors in the crypto-currency space offer enhanced functionality.

Returning to FIG. 2C, the decentralized finance computing system 222 and its included decentralized applications (dApps) are a primary component of a DeFi computing system. The dApps are like traditional software applications except they are configured to operate within a decentralized smart contract platform. The benefit is that requests using the dApps are permissionless and have censorship resistance. Their use is open to any device capable of accessing the system, such as the customer computing devices 224 at 3.1 and the vendor computing devices 226 at 3.2. No single organization system body controls them. Additionally, A separate but related concept is a decentralized autonomous organization (DAO), which has its instructions of operation encoded in smart contracts that determine who can execute what behavior or upgrade. It is common for a DAO to have some kind of governance token, which gives an owner some percentage of the selection of future outcomes.

In an illustrative example, the customer devices 224 and/or vendor devices 226 may access one or more features via a computing network connection. For example, a customer may access claims computing functionality of the decentralized finance computing system 222 at 3.1.1 and a vendor computing system may access remittance computing functionality of the decentralized finance computing system 222 at 3.2.1. Information regarding these communications and/or electronic data exchange transactions may be stored in a data log during operation at 4. For example, exception data logs information may be stored, such as the information shown in the table 310 of FIG. 3. At 4.1, information may be communicated to the graph-based transformers and policy generation engine 214 and/or the data store 212 via an API 219 and/or an intelligent autorouter 218 at 4.2.1. In some cases, the intelligent autorouter 218 may provide generated policy information, for example received via API 217 at 2.1, to other computing networks within the system discussed in further detail below.

Figure 2D:

FIG. 2D illustrates operation of a decentralized autonomous organization for digital twin policy-based mesh ecosystem 239 according to aspects of this disclosure. In an illustrative example, a framework and a model used to implement the decentralized autonomous organization for digital twin policy-based mesh ecosystem 239 may be based on an industrial internet of things (IIoT) systems which may be cloud-based and/or implemented 'on-premises' (e.g., within the enterprise organization computing system). Different aspects of a software program system that is used to manage the different aspects for digital twin implementation and manage the metadata of the assets, processes, or systems involved in the digital twin system. In general, significant overlap exists between IIoT platforms and systems for Digital Twins. Often, Digital Twin systems are part of an IIoT platform.

Digital twin systems include a high level of connectivity. From the asset to the edge, the edge to the cloud, and the cloud to the cloud, connectivity can be broadly classified into multiple categories. For example, a first category may include connectivity between sensors and the asset. Sensors can be implemented within the physical asset, retrofitted during an upgrade procedure, or retrofitted aftermarket. As such, the sensors may be considered an external advantage that can be improved and upgraded. A sensor needs to interconnect with at least one essential system either per asset or per location. However, not all sensors may have wired connectivity. Further, some sensors may be battery operated as some physical assets do not include a power source (e.g., an aircraft on the ground without its engines on uses the ground power unit). Additionally, extra capabilities such as protocol conversions might be needed to translate a sensor protocol to a protocol common to the enterprise network connected devices. After assets or sensors are communicatively connected to a gateway and/or edge device. The asset might be wired to the data collector or the gateway device at a local location. In such cases, the sensor may need wireless communications capability such as Bluetooth Low Energy (BLE) or Wi-Fi. This setup allows one gateway device, or a minimal number of devices, to manage the connectivity for all the assets from one location to the IIoT Core/Digital Twin system, such as the digital twin policy-based mesh ecosystem 239—that may be cloud-based or in a remote data center. These devices may also aggregate or process the data.

From the edge device and/or the gateway device to the cloud different configurations may be necessary. For example, assuming that the IIoT or the digital twin policy-based mesh ecosystem 239 is in a public cloud or on a remote data center, the edge devices need to connect to the core and send the data in a safe method. In some cases, the edge device might process or store the data to some extent. With the development of 5G technologies, the included protocols and methods may allow for centrally viewing or maintaining the digital twin policy-based mesh ecosystem 239 and any remote field assets at one central location. In some cases, the data collection and information processing systems could be dissimilar and might be located on different cloud computing platforms. In such scenarios, the digital twin policy-based mesh ecosystem 239 may need the ability for communication between the clouds. Here, cybersecurity becomes important when data is stored off-premises. These connectivity scenarios are required to facilitate different architecture paradigms of the digital twin framework. In some cases, either for local communication or cloud-based communication scenarios, the differences between the systems may be obfuscated from the operation of the digital twin policy-based mesh ecosystem 239 through use of APIs, such as the API 237. As shown, the API 237 may be used to facilitate communication of information (e.g., data, generated policy information, feedback on use of the generated policy and the like) between different computing systems on the enterprise computing network.

At 5.2, the system may capture and store data. The digital twin policy-based mesh ecosystem 239 consumes asset data, and then stores and organizes the data. A common format of data from sensors is time-series data, which may be stored in Histograms or time-series databases. Additional forms of shapeless data, such as video or sound files, which may be captured as part of a big data system, might also have to be stored in such organizations. Often, big data management and/or analysis systems might be used. The metadata or asset data along with the enterprise data are stored in a database (e.g., relational databases). Accessing the data may be performed using SQL, NoSQL, and other such technologies. For edge computing, data may be captured by sensors and/or may otherwise be provided by the assets and communicated to the core computing devices via the edge devices. In some cases, the edge devices may perform statistics shaping, preprocessing, analyzing, storing, and communicating the data. The digital twin policy-based mesh ecosystem 239 components may be distributed between the edge system and the core system. The digital twins of the digital twin policy-based mesh ecosystem 239 comprising organically discrete assets may exist in the core or the central site. The edge can be used to deploy the twin of a single asset on the convoy.

The edge devices associated with the digital twin policy-based mesh ecosystem 239 may include processing power to run an incomplete form of algorithms and analytics in near real time for a specified asset. As such, the digital twin policy-based mesh ecosystem 239 may include processing for the algorithms and analytics models at the asset level may be organized either at the edge or within the core. Contingent on the volume, nature, and speed of computation required in the edge, the edge device may include use of one or both of a central processing unit (CPU) and a graphics processing unit (GPU). A characteristic illustration of the necessity of a GPU is when dealing with large amounts of data (e.g., video data) where a need for processing it at the edge device level, exists. Even in the core devices, the system running the IIoT or the digital twin policy-based mesh ecosystem 239 may use a combination of virtual machines, servers, or high-performance computing (HPC), which is often equipped with GPUs. Additionally, GPUs are deployed when learning with complex Artificial Intelligence (AI) procedures, counting deep learning.

The generic abilities of the building blocks of the digital twin policy-based mesh ecosystem 239 may be referred to as the platform. The stage prevents the rebuilding of the same collection of generic capabilities over and over again. Different illustrative platforms provided by different vendors may be included into that category for IIoT platforms. These platforms provide functionality to serve a wide variety of use cases across multiple industries. Additionally, the applications built on top of these platforms could serve a very specific purpose or multiple different purposes. For example, the same platform might be able to manage the digital twin of a pacemaker, aircraft, or automobile. However, the application and objectives of these applications could be very different. Sometimes, a layered approach may be taken where, on top of an IoT platform, an industry-specific or functionality-specific (asset monitoring versus manufacturing) application family might be developed, such as for the aviation or personal wellness industry. This application specific layer might try to generalize the common application needs that are often seen in that industry along with the industry-specific security and compliance requirements. Then, another layer of the application might be provided to process a specific set of assets such as the jet engine in the aviation industry or a pacemaker in the therapeutic devices segment.

In some cases, the digital twin policy-based mesh ecosystem 239 may include a user interface or other visualization capability. The digital twin policy-based mesh ecosystem 239 may include a base that provides rudimentary visualization capabilities such as the visualization of the Digital Twin, an asset monitoring dashboard with warning capabilities, or a fleet view of the asset twins. Users may reuse or customize these capabilities or build a customized digital twin visualization with specific outcomes in mind. In further sophisticated solutions, AR or VR might be used for enhanced interaction with the asset Digital Twins.

In some cases, a human may interact with different aspects of the enterprise environment as described herein, such as with the digital twin policy-based mesh ecosystem 239, aspects of an XR-environment or the like. As such, benefits may be provided by including a human in the loop and/or field services. The comprehensive set of competences that allow humanoid hands to gain insights into the possessions via the digital twin, and take appropriate actions, would fall in this category. For example, a field service professional might use augmented reality/virtual reality (AR/VR) to augment their interaction with the asset in the field location, such as when dealing with unscheduled maintenance.

Digital twins may also provide product feedback, processes/operations, and/or training. The digital twin policy-based mesh ecosystem 239 may provide a response loop to increase insights into the operation of the digital twins, which may be analyzed via one or more via information management systems. For example, a designer and applied scientist may be able to mine that information to improve future products or, in the case of software-defined products (such as a Tesla car), provide the future revisions of the product in the field. Tesla uses over-the-air (OTA) updates to its software in the car to improve the current product over its lifetime 5.9 Software development paradigms and low code. Here, feedback may be provided based on use and operation of automatically generated policies, such that improvements may be made to weighting algorithms, retraining of models (e.g., AI models) used to generate new policies, and/or the like. As such, the software development framework should be vigorous and functionally rich to allow agile and rapid development. The software development framework used for the decentralized dynamic policy learning and implementation system may include a cloud-native or microservices framework and/or a low-code development framework and other components discussed herein. The decentralized dynamic policy learning and implementation system may utilize one or more software development kits (SDK) and application programming interfaces (API) to allow the collaboration between different computing systems utilized by different teams and companies in the entire ecosystem.

Figure 2E:
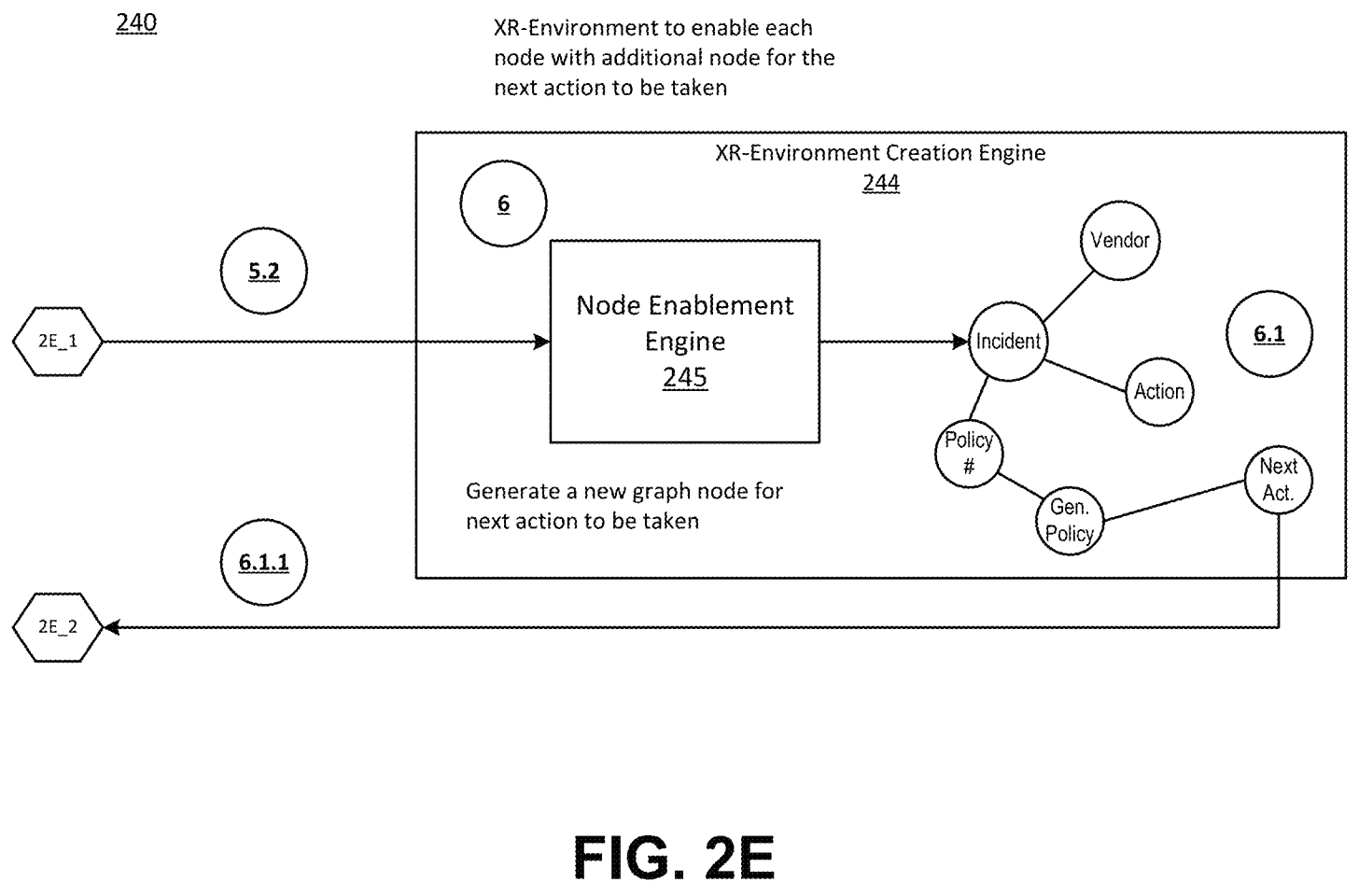

FIG. 2E shows an illustrative XR-environment generation system 240 that augments each node of a generated policy with an additional node representative of a next action to be taken as part of the newly generated policy. For example, the XR-environment generation system 240 may include an XR-environment creation engine 244 that may further include a node enablement engine 245 to facilitate creation of a new graph node for a next action to be taken in the newly generated policy. In addition the XR-environment creation engine 244 may facilitate creation of an XR-environment for use in an immersive XR environment to evaluate system information based on the newly generated policy. At 6, the XR-environment creation engine 244 may generate a new graph node for a next action to be taken. In some cases, a compliance policy (e.g., a monetary use obfuscation compliance policy) may show a need, which motivates the shape and content of our monetary use obfuscation compliance data model.

From a monetary use obfuscation compliance modeling point of view, an "AS A" clause may establish a context comprising two entities—a vendor and an action—plus the "LIKES" relationship that connects them. An "I WANT" clause may then pose a question: which policy steps need to be automatically generated? This question exposes more "LIKES" relationships, and more definition regarding a next action to be taken. The monetary use obfuscation compliance incident and/or associated relationships identified examining the policy model may be analyzed examining the Policy data model, as shown in FIG. 2E. Because this monetary use obfuscation compliance model directly encodes the question of Generate Policy, it lends itself to being queried in a way that likewise reflects an answer. When two or more domain entities and/or monetary use obfuscation compliance policies interact for a historical of time, a detailed data point occurs. This information may be represented as distinct nodes, with connections to each of the entities engaged in that fact. Modeling an action in terms of its product—that is, in terms of the "thing" that results from the action—produces a like structure. This structure may be a middle node and/or compliance data that represents the outcome of an interaction between two or policy entities. Timestamp properties on this middle node may be used to represent start and end times.

Figure 2F:
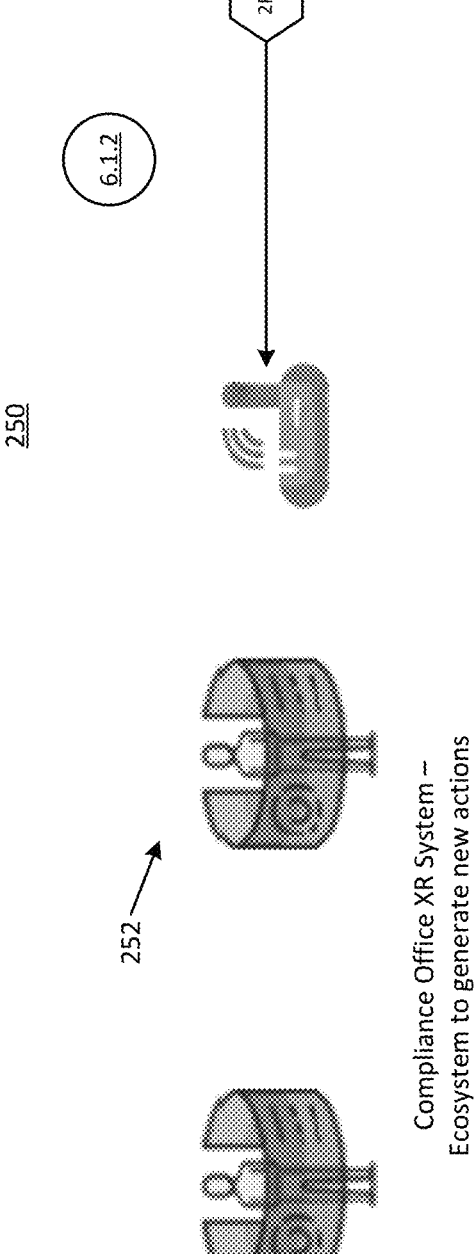

FIG. 2F shows an illustrative XR-environment system 250. At 6.1.2 an XR-environment may be received by an XR-environment interaction device 252, where a compliance officer may interact within an immersive environment to generate and/or test a new action of the automatically generated process.

In some cases, a position of compliance officer of an enterprise organization was created as a result of multiple financial statement scandals in the past, but any fraud prevention program in a company may include individuals in similar positions to prevent all types of fraud. A compliance officer may analyze information identified by one or more of the autogenerated polices to identify aspects of multiple financial crimes and/or malicious activities. The compliance office includes computing systems configured to assist in identifying notable aspects of fraud and/or other malicious activities, such as by implementing automatic operation and integration of the automatically generated policies discussed herein. In some cases, the compliance office policies codifies aspects of questions used to identify certain aspects of fraudulent and/or malicious activity. For example, information that may signal financial statement fraud may include processing policies that automatically collect information answering questions, such as: Does organization display important disregard for rules or controls? Has the organization restricted the auditor's access to documents or personnel? Has management set impractical financial goals? Does one person or small group dominate management? Other information that may be identified via the policies may include certain revenue recognition policies, recurrent changes in bookkeeping policies regarding bad debt reserves, depreciation and/or amortization expenses or comprehensive income, uncorroborated topside entries affecting income, underfunded defined pension plans, management compensation that is seriously out of line with company performance numbers, and/or the like.

Additionally, the compliance office computing systems may process information based on one or more automatically generated policies to analyze financial statements to identify fraud cases, which may contain the following recurring themes: Pressure on senior management to meet monetary goals, credit card fraud, oppressive senior management, improper accounting practices, feeble internal controls, and lack of whistleblowers or policies that discourage such activities.

Credit card fraud still exists as an impactful crime for clients and businesses and, as such, requires automated policies to identify the evolving schemes fraudsters use in an attempt to bypass existing security measures. Credit card fraud encompasses several different aspects including, for example, whipped cards. Here, the card itself has been substantially taken from the cardholder and used before the theft is reported by the cardholder and deactivated by the credit card issuer. Additionally, credit card identify fraud involves cases where the card itself is not stolen, but the card information is obtained through various methods and used by an impostor to order items online or through the mail. Now, clever fraudsters have learned that they have a better chance of successfully completing the fraud if they use the real billing address of the cardholder and a different "ship to" address, which may be used to identify the fraudulent activity. Random number generators are software programs that generate random card numbers and identify which of the generated numbers that are valid. Only valid credit card numbers will work, as virtually all credit card order systems screen out credit card numbers that have not actually been assigned. The fraudster then places large numbers of orders, each with a different credit card number. Merchants using "velocity" tables easily catch multiple orders on the same credit card number. Velocity tables look for multiple orders to one address in a short period. Another fraudulent activity is the false credit or return scam, which is an internal credit card fraud process. Customer service is important to all companies. When a customer is not happy, most organizations have policies that try to make things right for the customer. Often, these policies result in refunding money to the customer. Dishonest employees may enter a bogus refund request into the system even though no merchandise was returned. Because there is no real customer asking for a credit, the employee credits the refund to their own credit card. As such, credit card refunds may be analyzed periodically to look for multiple refunds to the same credit card number or an unusual number of credits processed by the same employee.

In some cases, credit card fraudsters can obtain valid numbers in a variety of ways. One way is to buy these numbers from a "credit doctor." A credit doctor is a malicious actor that can get stolen credit card numbers for those who are unable to get their own credit cards. The standard rates for purchasing stolen credit card data (a valid number and expiration date) vary from forty cents to $20 per card. In some cases, individuals may offer numbers for much less, but these are sucker numbers, which have already been fraudulently used. Purchasers and users of the sucker numbers are much more likely to be caught by authorities, since the cardholder will already have reported fraud on the card. Devious fraudsters use cards for themselves and then sell them to secondary fraudsters. These secondary fraudsters then become the targets of investigators, taking the heat off the first fraudster. Additionally, fraudsters may obtain "good" numbers is to provide illicit payments to individuals in positions that handle credit card payments, such as hotel desk clerks, call center agents, and gas station attendants. Organized credit card gangs may send people to apply for these jobs for the sole purpose of obtaining as many credit card numbers as possible.

Any company that uses the Internet or telephones to take orders relies on credit card transactions, but these "card not present" transactions may have inherent risks. For example, these transactions require only a valid credit card number, the expiration date, and the name and address of the cardholder. While a majority of all credit card transactions are in-person transactions, a larger percentage of online credit card transactions are fraudulent. It has been estimated that 28 percent of online retail orders are fraud attempts.

Although credit card companies have consistently maintained that credit card fraud is no more prevalent online than in traditional forms of commerce, a number of experts are disputing the notion. One estimate says that up to 40 percent of online purchases may be fraud attempts. Accordingly, online retailers who cannot control the flood of fraudulent purchase attempts will soon be out of business. Some people say that doing business on the Internet is highly risky and may be exposed to more risk than traditional bricks-and-mortar stores.

Merchants, not the consumers, are exposed to the most risk from credit card fraud. Federal laws limit consumer risk exposure to $50 for fraudulent use of a stolen credit card but in reality consumers are never assessed that cost. Since bricks-and-mortar shop merchants employ card readers, which require the actual card to be present, and a signature, the credit card company absorbs any fraud losses. Internet and shop-by-phone merchants have no such protection. The credit card company may accept no responsibility for fraudulent online transactions. The credit card company reimburses the cardholder for unauthorized purchases and deducts the amount from the merchant's credit card account. In some cases, a charge, called a chargeback, may be added per transaction.

Credit card companies may also impose fines on merchants if chargeback orders make up 1 percent or more of total dollar sales transactions, or 2.5 percent or higher of the total number of sales for more than two consecutive months. These rules could well force smaller internet retailer off the Web. However, some observers believe that the credit card companies are attempting to punish those merchants, which are seen as having lax credit card authorization policies.

As such, online merchants have been forced to develop sophisticated security protections that go far beyond the normal security approval process by the credit card companies. However, customers still expect to have the ability to bill an order to one address and ship the goods to another address. This is a weakness that credit card fraudsters improperly utilize.

For example, credit card fraudsters make an order as the cardholder, entering the cardholder's name and address in the "bill to" field. They then put a temporary address in the "ship to" field. By the time the charge appears on the cardholder's bill, the orders have already been received and the fraudster is gone. Not all fraudsters use temporary addresses. Some fraudsters have been known to use the same address for years to receive orders. Therefore, companies have implemented policies to protect themselves by tracking addresses used to receive fraudulent orders. For example, denial tables (lists of known fraud addresses) may be used to prevent subsequent orders from being shipped to a known fraud-associated address. Denial tables may also be used to screen for any new orders to known fraud addresses. These denial tables should never try to match by the name of the customer, as false names are almost always used and are changed often. Fraudsters also have been known to alter the last digit in the delivery ZIP Code to defeat denial tables. The local post office or the private delivery carrier will often correct the last digit. In some cases, policies may be generated to adapt to such methods by automatically altering processes based on feedback received from information tables.

Additionally, a clever form of mail order credit card fraud has emerged thanks to online auction houses. Fraudsters can list an item for auction online before the fraudster even has the item. As such, when the winning bidder is determined, the fraudster orders the item using a stolen credit card number. If the stolen credit card is from John Smith in New York, that address is entered in the billing address; however, the winning bidder's home address is entered as the "ship to" address. As such, many mail order-based businesses have implemented policies to compare the billing and shipping addresses and will not ship to any address other than the billing address of record for the credit card being used.

Beginning in 2003, many Internet vendors saw a steady increase in the number of fraud attempts. Much of the increase in credit card fraud on the Internet can be directly attributed to a credit card scam started in Nigeria known as the forwarder scam or the reshipping scam.

Professional fraudsters may surf Internet chat rooms looking for impressionable people on which they work. For example, the fraudster may give a victim a story of how unfair the trade tariffs are in Africa on computer items. They ask the victim to accept orders from several merchants at the victim's home, and they ask the victim to forward the items to an address in a different country, for example Lagos, Nigeria, or elsewhere. The fraudsters offer to pay the forwarder a large fine (e.g., $100) per package. Often the fines promised would be more than any tariff the fraudster is alleging to avoid. The naïve victim agrees and begins to receive packages. All orders may be placed on a different stolen credit card for an amount that is usually less than a flagged amount (e.g., $500.00). This popular amount is frequently used as a limit for fraud screening on orders in the industry. Of course, the victim never gets paid for forwarding the goods.

Some victims have decided just to keep all the merchandise, which sometimes results in threats over the telephone. The typical victim of the scam is a male between 15 and 24 years old, and the fraudsters often pose as young women. Some have even sent a photo of a pretty young blonde, who is supposed to be the person with whom the mark is communicating. Police have been finding these mail drop forwarders who have been duped into forwarding stolen merchandise. Further, more advanced scammers use accomplices in the United States who rent warehouse space to use as a staging area for sending stolen goods overseas. Many such warehouses have been raided in Atlanta, Houston, Miami, and other cities, and authorities have found computer equipment and office supplies stacked to the ceiling, all bound for Nigeria, or sometimes Russia, Ghana, or the Ukraine.

The U.S. Postal Inspection Service organized a national initiative on this particular fraud. They interviewed over 700 victims of the reshipping scam who had fallen for "work from home" ads on various wb sites for positions such as a "home warehouse expeditor." One gentleman in a retirement community thought he was assisting "a nice girl from London who is starting a business in Nigeria." He had paid to ship more than 70 boxes to Nigeria. This scam is still going strong because it works. Fraudsters like high-tech items but also go for clothing and shoes, which they can sell quickly on the street.

Enterprise organizations implement policies to automate several tools in an attempt to recognize and prevent fraudulent activities, such as those discussed above. Many organizations may use a "denied party list" to stop mail order fraud. If a fraud is discovered, the address is blocked to prevent any future orders. Although it is a good tool, a denied party list is not an effective protection against fraud by itself. For example, many methods exist a fraudster to create address variations that evade a company's use of denied party lists as the sole strategy to prevent mail order fraud. Automated policies that use denied party lists along with velocity screening, Address Verification System (AVS) code blocking, and Card Security Value (CSV) can greatly reduce fraud losses.

Velocity refers to the number of orders to one address in a short period. The order management system may include a policy to flag addresses that have more than three orders per week. Forwarder scams usually employ the same address for a short period of time, but use different credit card numbers. In some cases, the billing address is not the one on file with the credit card company.

An address verification system (AVS) involves an authorization to compare the address provided by the online customer with the address of record for the credit card holder of that credit card number. There are three levels of address matching: (1) street number, (2) the first five digits of the zip code, and (3) the extra four digits of the zip Code. The extra four digits of the zip code are not widely used, so there are only two levels that should be addressed, street number and five-digit zip Code. Credit card orders that have a customer-provided billing address that does not match the street number on the billing address on file with the credit card provider would result in a certain AVS code. These AVS codes identify whether the street address matches, if the zip code matches, if both match, or if neither match.

Middleman companies (e.g., a credit card processing and risk management solutions company) may handle credit card payment verification for merchants using credit card merchant accounts. These companies generate AVS codes based on the information contained in online credit card transactions. Many companies set a preset address verification programs to automatically cancel orders that are returned from the address authorization process with 1-8 type AVS codes. An 1-8 AVS code means that neither the street address number nor the ZIP Code the customer has provided match the billing address of record for the credit card being used.

Clients whose orders are coded as 1-8 are notified by an e-mail message saying that the billing address provided on their recent order does not match the address of record with the credit card provider. Real customers, who may have moved without officially notifying the credit card provider, will simply reorder using the proper address of record, the address to which their credit card statement is mailed. Fraudsters are defeated unless they have the billing address of the person whose credit card number they stole. AVS blocking will not stop the small minority of fraudsters who know the actual billing address for the credit card number they are trying to use. Of course, such information may be obtained via a captured credit card statement, or even through an online search.

Many fraudsters still use randomly generated credit card numbers, hoping for a match to a valid card. Again, only valid card numbers will work, as virtually every order management system screens out credit card numbers that have not been assigned to a cardholder.

A compliance program may be designed to capture information associated with fraud, even as the fraudsters modify their activities. A compliance office may look into controlling an anti-corruption compliance program for an association, where compliance program uniqueness is a key deliberation. A compliance program may be both industry-specific and unique to the organization; tailored to fit the requirements of the individual organization, particular geographic operating locations, related risks, and the overall compliance requirements of its specific industry. But the compliance program should also reflect the compliance requirements obligatory on all corporations and the laws that they must follow. For example, an anti-corruption program must be integrated into the overall compliance program. Each organization must ensure that their compliance programs are receiving ongoing and individualized evaluation and modification.

The compliance office looks into anti-corruption compliance programs must address the inherent risks, particularly when doing business in different countries. These risks result from the various aspects and forces that come into play in the global business environment. These risks are particularly problematic to the Foreign Corrupt Practices Act (FCPA) and other anti-corruption laws implemented in various countries. Many companies prosecuted for FCPA violations over the years either outright ignored or were willfully blind to these risks. Their compliance programs were inadequately designed to recognize and mitigate risk.

The following are key business issues relevant to corruption risk and illustrate examples of information examined and where weights are applied when automatically generating a new policy based on analysis of system information. For example, these issues may include commercial contracts, deals, sales, and marketing, business partners and third parties, trade with government officials, state-owned enterprises, sales consultants, joint ventures, mergers and acquisitions, conflicts of interest, simplifying payments, travel and entertainment of foreign government officials, gifts to foreign government officials, promotional expenses, lobbyists, charitable donations, a country risk as defined by Corruption Perceptions Index and other informational sources, and the like.

Additionally, a compliance office may also implement automated processes to implement an effective anti-corruption compliance program, such as by automating anti-corruption standards and procedures, implementing sensible efforts to exclude prohibited persons, training and communication programs, mechanisms for reporting violations and seeking guidance, programs for ensuring third-party due diligence, analysis and/or inclusion of anti-corruption contractual clauses, internal accounting controls, monitoring, auditing, and evaluating program effectiveness, monitoring success of performance incentives and disciplinary actions, analyzing a response to criminal conduct and remedial actions, and/or the like.

These program fundamentals are not anti-corruption program specific and are interconnected to functions and practices across an organization and compliance office. The compliance office may run an automated compliance program that ensures all employees are specifically aware of which actions are prohibited by the FCPA. The compliance office ensures that special clauses in their contracts whereby local agents and partners confirm that they will not violate the FCPA, as well as other anti-corruption laws. Compliance office annoyed to avoid the FCPA by having local joint venture partners commit bribery while the United States companies are willfully blind. This use of third parties will not prevent a FCPA prosecution. Additionally, the compliance office policies may monitor unusual payment patterns or financial arrangements, a history of corruption in the country, refusal by the foreign joint venture partner or representative to provide a certification that it will not take any action in furtherance of an unlawful offer, promise, or payment to a foreign public official in violation of the FCPA, unusually high commissions, identify a lack of transparency in expenses and accounting records, and may identify an apparent lack of qualifications or resources on the part of the joint venture partner or representative to perform the services offered.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:
a first computing device comprising:
  a first processor; and
  non-transitory memory storing first instructions that, when executed by the first processor, cause the computing device to:
    receive, from a data storage device, a data log comprising a plurality of records comprising information associated with a newly reported incident;
    generate, based on an analysis of the plurality of records by a weighting engine, an electronically implemented policy via weights and historical compliance data fed to a graph node format engine;
    format, by a policy generation engine, a property graph comprising nodes, relationships, and properties comprising key-value pairs to connect and structure the nodes and communicate, to a digital twin computing system, the electronically implemented policy;
a digital twin computing system comprising:
  at least one second processor; and
  second non-transitory memory storing second instructions that, when executed by the at least one second processor, cause the digital twin computing system to:
    implement the electronically implemented policy to monitor operation of the digital twin computing system that consumes asset data received via a plurality of sensors providing data in real-time, wherein implementation of the electronically implemented policy comprises managing connectivity of the plurality of sensors and wherein each sensor is associated with a physical asset;

receive, via a digital twin mesh network, operational data at least partially processed by an asset-level computing device contingent on a volume, nature, and speed of computation required, wherein the operational data corresponds to operation of the electronically implemented policy;

generate, based on processing of the operational data, information generated during operation of the digital twin computing system; and communicate, to an extended reality (XR)-environment system, the electronically implemented policy and information generated during operation of the digital twin computing system; and the XR-environment system comprising:

a third processor; and third non-transitory memory storing third instructions that, when executed by the third processor, cause the XR-environment system to:

generate, based on the electronically implemented policy generated from the electronically implemented policy, an immersive XR-environment visualization of electronically implemented policy operation and comprising a plurality of nodes;

update, via a user interface, the electronically implemented policy; and cause, based on the information generated during operation of the digital twin computing system and an input received via the XR-environment system, a new node to be displayed in the immersive XR-environment visualization of the electronically implemented policy operation.

2. The system of claim 1, wherein the plurality of records in the data log comprises an alert count, wherein the alert count corresponds to a violation of an existing electronically implemented policy.

3. The system of claim 2, wherein the first instructions further cause the computing device to initiate generation of the electronically implemented policy when the alert count is greater than a specified threshold.

4. The system of claim 1, wherein the first instructions further cause the computing device to generate the electronically implemented policy in a graphical node format.

5. The system of claim 4, wherein the graphical node format comprises a plurality of nodes, wherein each node corresponds to one of an associated source, an associated action, incident information, a policy identifier, and new policy information.

6. The system of claim 1, further comprising a validation computing device comprising:

a fourth processor; and fourth memory storing instructions that, when executed by the fourth processor cause the validation computing device to:

validate operation of the electronically implemented policy based on operation of an external application computing system, wherein the external application computing system provides an electronic product or service to a customer; and communicate, via a network, validation feedback to the first computing device.

7. The system of claim 6, wherein the first instructions further cause the computing device to adjust the electronically implemented policy based on the validation feedback.

8. The system of claim 6, wherein the first instructions further cause the computing device to adjust a plurality of weights assigned to input information entry types, wherein the electronically implemented policy is generated based on weighted input information.

9. The system of claim 1, further comprising a decentralized finance computing system comprising a plurality of distributed microservices running in a distributed environment, wherein the distributed microservices comprise at least a claims service, a remittance service, a billing service, and a collections service.

10. The system of claim 1, wherein the digital twin computing system comprises a plurality of digital twin bots operating in an interconnected environment and wherein the second instructions cause each bot of the plurality of digital twin bots to apply the electronically implemented policy to one of a plurality of data sets.

11. The system of claim 10, wherein each bot of the plurality of digital twin bots is associated with a different one of the plurality of data sets.

12. The system of claim 10, wherein each data set of the plurality of data sets is associated with a different knowledge base corresponding to a different malicious activity.

13. The system of claim 12, wherein each different knowledge base corresponds to a different one of a monetary use obfuscation knowledge base, an operational risk knowledge base, a market misconduct risk knowledge base, an information security knowledge base, a data cross-border risk knowledge base, and a general misconduct or malicious activity knowledge base.

14. The system of claim 1, wherein communication between different computing devices is performed via one or more application programming interfaces.

15. A method comprising:

receiving, from a data storage device, a data log comprising a plurality of records comprising information associated with a newly reported incident;

generating, based on an analysis of the plurality of records, an electronically implemented policy via weights and historical compliance data fed to a graph node format engine;

formatting, by a policy generation engine, a property graph comprising nodes, relationships, and properties comprising key-value pairs to connect and structure the nodes communicating, to a digital twin computing system, the electronically implemented policy;

implementing, by the digital twin computing system, the electronically implemented policy to monitor operation of the digital twin computing system that consumes asset data received via a plurality of sensors providing data in real-time, wherein implementation of the electronically implemented policy comprises managing connectivity of the plurality of sensors and wherein each sensor is associated with a physical asset;

receiving, via a digital twin mesh network, operational data at least partially processed by an asset-level computing device contingent on a volume, nature, and speed of computation required, wherein the operational data corresponds to operation of the electronically implemented policy;

generating, based on processing of the operational data, information generated during operation of the digital twin computing system;

communicating, by the digital twin computing system to an extended reality (XR)-environment system, the electronically implemented policy and information generated during operation of the digital twin computing system;

generating, by the XR-environment system based on the electronically implemented policy and the information generated during operation of the digital twin computing system, an immersive XR-environment visualization of electronically implemented policy operation and comprising a plurality of nodes;

updating, via a user interface, the electronically implemented policy; and causing, based on the information generated during operation of the digital twin computing system and an input received via the XR-environment system, a new node to be displayed in the immersive XR-environment visualization of the electronically implemented policy operation.

16. The method of claim 15, wherein the digital twin computing system comprises a plurality of digital twin bots operating in an interconnected environment and wherein the method further comprises applying, by each digital twin bot, the electronically implemented policy to one of a plurality of data sets.

17. The method of claim 16, wherein each data set of the plurality of data sets is associated with a different knowledge base corresponding to a different malicious activity.

18. The method of claim 17, wherein each different knowledge base corresponds to a different one of a monetary use obfuscation knowledge base, an operational risk knowledge base, a market misconduct risk knowledge base, an information security knowledge base, a data cross-border risk knowledge base, and a general misconduct or malicious activity knowledge base.

19. The method of claim 15, further comprising adjusting the electronically implemented policy based on validation feedback.

20. The method of claim 15, further comprising adjusting a plurality of weights assigned to input information entry types, wherein the electronically implemented policy is generated based on weighted input information.

* * * * *